US00H002287H

(19) United States
(12) Statutory Invention Registration
Vitse et al.

(10) Reg. No.: US H2,287 H
(43) Published: Dec. 3, 2013

(54) REDUCED CARBON STEEL CORROSION IN $CO_2$-$O_2$ AMINE ENVIRONMENT

(76) Inventors: Frederic Vitse, Knoxville, TN (US); Stephen A. Bedell, Knoxville, TN (US)

(21) Appl. No.: 13/106,227
(22) Filed: May 12, 2011

Related U.S. Application Data

(60) Provisional application No. 61/348,293, filed on May 26, 2010.

(51) Int. Cl.
*C23F 11/14* (2006.01)

(52) U.S. Cl. ..... 252/392; 252/390
(58) Field of Classification Search ..... 252/390, 252/392
See application file for complete search history.

(56) References Cited

U.S. PATENT DOCUMENTS

| | | | | | |
|---|---|---|---|---|---|
| 4,279,872 | A | * | 7/1981 | Lassmann et al. | 423/228 |
| 4,431,563 | A | * | 2/1984 | Krawczyk et al. | 252/189 |
| 4,959,177 | A | * | 9/1990 | Schutt | 252/391 |
| 2009/0220620 | A1 | * | 9/2009 | Dickinson et al. | 424/677 |

* cited by examiner

*Primary Examiner*—Daniel Pihulic
(74) *Attorney, Agent, or Firm*—McNees Wallace & Nurick LLC

(57) ABSTRACT

A structural low carbon steel in combination with and in contact with an aqueous MDEA solvent that includes as an amine-based chemical additive. When mixed with MDEA solvent to form a MDEA solution, the MDEA-based solution in contact with carbon steel reduces the corrosion rate of low carbon structural carbon steels having a carbon content greater than about 0.18% by weight is significantly reduced when the concentrations of $CO_2$, $O_2$ and heat stable salts (HSS) are controlled below critical amounts. The MDEA solution, when controlling the concentrations of $CO_2$, $O_2$ and HSS below critical amounts, suppresses the corrosion of carbon steel having a carbon content greater than about 0.18%. A smooth surface finish further suppresses the corrosion of the low carbon structural steel. When the $CO_2$, $O_2$ and HSS are maintained below critical values, a low carbon structural steel having a micropolished surface finish displayed improved corrosion resistance.

11 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

(a) Day 1 (b) Day 3

(c) Day 5 (d) Day 7

Figure 2: SEM surface morphologies of carbon steel with time in 50 wt.% MDEA / 12% $CO_2$ / 6% $O_2$ / HSSs.

Photomicrostructure of A36 carbon steel

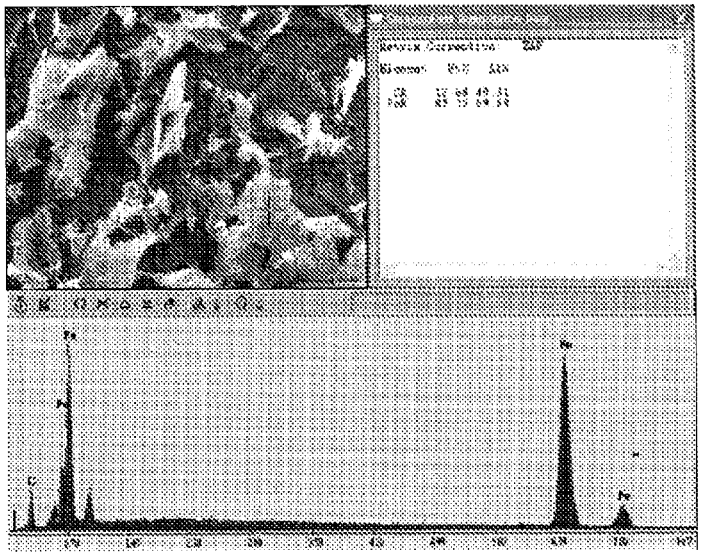
(a)
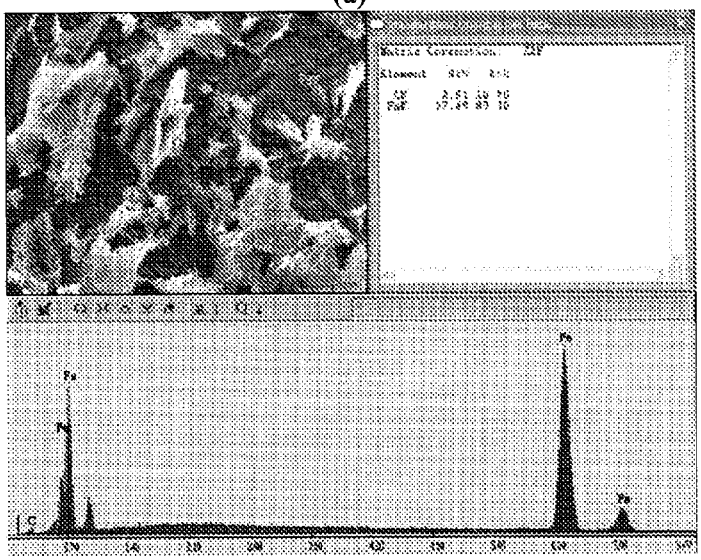
(b)
Results of EDS analyses for corroded sample after 7 days in 50 wt.% MDEA / 12% $CO_2$ / 6% $O_2$ / HSSs: (a) Pearlite region and (b) Ferrite region
Figure 4

REDUCED CARBON STEEL CORROSION IN $CO_2$-$O_2$ AMINE ENVIRONMENT

RELATED APPLICATION DATA

This application claims the benefit of U.S. Provisional Application Ser. No. 61/348,293, which was filed on May 26, 2010, herein incorporated by reference.

FIELD OF THE INVENTION

The present invention is directed to the use of carbon steel in a $CO_2$-$O_2$-amine environment that reduces the corrosion of the carbon steel, and specifically, to the use of carbon steel including at least 0.18% carbon in an aqueous solution of methyldiethanol amine (MDEA) solvent that contains both dissolved $CO_2$ and $O_2$.

BACKGROUND OF THE INVENTION

Emissions from fossil fuel-fired power plants represent a significant source of carbon dioxide emissions, a known greenhouse gas. To significantly reduce $CO_2$ emissions from such power plants, $CO_2$ must be captured, compressed and transported to a sequestration site. One approach for capturing $CO_2$ from a conventional coal-fired boiler uses an amine-based solution to absorb $CO_2$ from the flue gas stream.

FIG. 1 is a schematic of a gas-treating system of a coal-fired plant utilizing a typical alkanolamine treating unit. The feed gas containing $CO_2$ flows into the bottom of the absorber where it contacts an amine solution. The $CO_2$ gas component is removed from the gas stream by chemical reactions with the amine which flows counter-concurrently. The purified gas is the overhead product path, while the rich amine solution is removed from the bottom of the absorber to the rich amine flash drum. In the flash drum, the rich amine flashes at a lower pressure to remove dissolved and entrained hydrocarbons. The rich amine then flows from the flash drum through a lean/rich amine heat exchanger and on to a stripper/amine regenerator. In the stripper/amine regenerator, the $CO_2$ gas component is stripped from the solution using heat supplied by the regenerator reboiler. $CO_2$ gas is the amine regenerator overhead product while lean amine solution is removed from the bottom of the regenerator. The hot lean amine from the regenerator is heat exchanged with the rich amine, cooled and then returned to the absorber.

Removing $CO_2$ with amine solvent results in corrosion problems in apparatus that is in contact with the amine solution. The equipment and piping in an amine plan are usually made of steel, either carbon steel or stainless steel. It is common practice to utilize stainless steel in locations of the separation plant where carbon steel would corrode resulting in a failure. Carbon steel can be subject to uniform and localized corrosion such as pitting, galvanic corrosion, erosion, stress cracking and intergranular corrosion when in contact with amine solutions having carbon dioxide and other impurities from the exhaust gases resulting from the combustion of coal. Carbon steel is generally used for the absorber, lean amine tubes, the reflux drum, and the regenerator shell. Stainless steel, such as austenitic 304 stainless steel, is used for the absorber, regenerator internals, rich-lean heat exchangers, pump impellers, and rich amine piping.

While stainless steel has a particularly long life, it is very expensive and therefore not desirable. Because the amine solution is used for the capture of $CO_2$ from a combustion gas, the amine solution usually contains additional impurities in solution that further shorten the life of carbon steel when the amine solution is contacted to it, further making carbon steel a less than desirable choice for use in a separation plant and increasing the cost of the plant. What is desirable is an amine solution that can be used with carbon steel such that the carbon steel in contact with amine solution has a reduced corrosion rate.

SUMMARY OF THE INVENTION

The present invention utilizes carbon steel in combination with, and in contact with, an aqueous methyldiethanol amine (MDEA) solvent that includes as an additive an organic carbon compound for gas capture, while improving the corrosion resistance of the carbon steel in a gas-treating system of a coal fired plant, the gas treating system being an alkanoamine treating unit. When the additve is dissolved in MDEA solvent (the MDEA solvent that includes the organic carbon compound, hereinafter is referred to as a MDEA-based solution), the corrosion rate of low carbon structural carbon steels having a carbon content greater than about 0.18% by weight is significantly reduced when the concentrations of $CO_2$, $O_2$ and heat stable salts (HSS) also are controlled below critical amounts. Heat stable salts include salts of bicene, formic acid and sulfuric acid as representative compounds. The combination of MDEA with an organic carbon compound, while controlling the concentrations of $CO_2$, $O_2$ and HSS below critical amounts, suppresses the corrosion of carbon steel having a carbon content greater than about 0.18%. The concentration of the organic compound is about 40% wt. The MDEA concentration can vary but the total amine concentration (MDEA+organic compound additive) should not be higher than about 60% by weight, with the balance being water. The MDEA-based solution in contact with structural carbon steel having a content greater than about 0.18% C results in spontaneous passivation of the steel.

The metallurgical composition of the structural carbon steel also affects the corrosion rate of the surface in contact with MDEA-based solution. As is well-known, in low carbon structural steels, the carbon content influences the microstructure. Higher carbon results in the formation of additional pearlite, which is a structure of alternating layers of ferrite and cementite. Silicon content also increases corrosion resistance. In a structural steel, such as A36 steel, increasing the carbon content of the surface of the steel in contact with the MDEA-based solution above 0.18%, and preferably above 0.23%, while also controlling the HSS to below 3% (the percentage of the heat stable salt anion) and preferably below 1.5%, and while also maintaining $CO_2$ and $O_2$ below 12% and 6% (by weight in solution) respectively reduces the corrosion rate of the carbon steel and changes the behavior of the steel to passive as the surface spontaneously passivates.

Surface finish also appears to affect the passivation of the carbon steels in contact with the MDEA-based solution. A smooth surface finish further suppresses the corrosion of the low carbon structural steel. When the $CO_2$, $O_2$ and HSS are maintained below critical values, a low carbon structural steel having a rnicropolished surface finish displayed more resistance to corrosion than low carbon structural steel having a sand-blasted surface finish or having a surface finish ground with #600 silicon carbide (SiC) paper. The surface preparation technique is a variable that can affect the final surface finish, so a technique should be selected to produce a micropolished surface finish.

An advantage of the present invention is that the use of the MDEA-based solution self-passivates the structural carbon steel contacting the MDEA solution. Because the structural carbon steel self-passivates, it does not corrode as quickly, so its life is extended. With an extended life, the replacement cycle for self-passivated structural carbon steel can be extended, thereby lowering equipment replacement costs for a plant.

Another advantage of the present invention is that structural carbon steel can continue to be used for certain applications and does not have to be replaced with expensive stainless steel.

Still another advantage of the self-passivation of the present invention is that structural carbon steel can be considered in applications heretofore not considered. It is possible to predict the life expectancy of the structural carbon steel in contact with the MDEA-based solution based on corrosion data so that consideration can be given to replacing expensive stainless steel with structural carbon steel when the $CO_2$, $O_2$ and HSS can be maintained below critical values.

Because the replacement cycle for self-passivated structural carbon steel can be extended, not only are savings realized by extended equipment life and reduced equipment replacement costs, but also the down time for plant maintenance is reduced, thereby reducing the operating costs of the plant, as the plant can remain operating for extended periods of time between maintenance cycles.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 are the results of EDS spectrographic analyses and photomicrographs for selected corroded samples after 7 days in 50 wt. % MDEA/12% $CO_2$/6% $O_2$/HSSs: (a) Pearlite region and (b) Ferrite region.

DETAILED DESCRIPTION OF THE INVENTION

Figure 1:
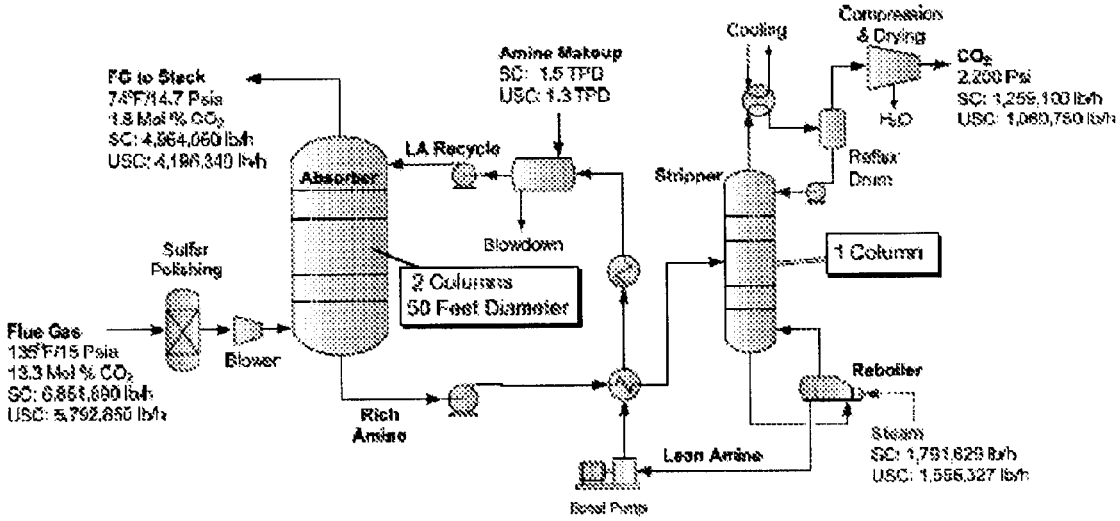
FIG. 1 is a prior art schematic of a gas-treating system of a coal-fired plant utilizing a typical alkanolamine treating solutions.

An amine-based chemical additive is added to a MDEA-based aqueous solvent to form a MDEA-based solution that suppresses corrosion in carbon steel components in a gas treating system of a coal-fired plant. The corrosion is otherwise observed when a MDEA-based aqueous solvent solely is used as an exhaust gas conditioning solvent for removing $CO_2$ from the exhaust gas. This MDEA-based solution of the present invention can extend the life of carbon steel components after the solution is used to condition the exhaust gas to remove $CO_2$.

Amine-based solvents are commonly used to separate acid gases such as $CO_2$ and $SO_2$ from a main stream gas such as natural gas, syngas, ammonia etc. More recently, these solvents have been used for capture of acid gases from combustion gases. In such applications, oxygen also is present in the combustion gas and is known to oxidize the solvent to form organic salts, also referred to as heat stable salts (HSS). These heat stable salts are difficult to regenerate, and accumulate in the solvent over time. These HSS are known to adversely impact corrosion of structural carbon steels used for components in gas separation plants. As their concentration rises in the solution, the severity of corrosion of structural carbon steels with which they are in contact increases. Currently, the problem is addressed by bleeding the solvent having accumulated HSS from the gas-treating system and replenishing the solvent in the system. Alternatively, the solvent may be reclaimed by distillation, electrodialysis, by use of an ion-exchange membrane or by use of a column.

MDEA is a tertiary amine that does not form carbamates when capturing $CO_2$, which has a great impact on corrosivity of amine solutions. Primary amines such as monoethanolamine (MEA) and diethanolamine (DEA) form additional products such as carbamates when capturing $CO_2$. In terms of relative corrosivity of amines, MEA is the most corrosive and MDEA is the least corrosive, with DEA being intermediate between MDEA and DEA based on plant experience and laboratory corrosion data. Regardless of the amine type utilized in the $CO_2$ capture process, the formation of HSS still remains a problem. The precursors of HSS are strong acids that lower the pH of the amine solution, while increasing solution conductivity and decreasing the efficiency of $CO_2$ capture.

The corrosion rate of MDEA in the presence of $CO_2$, $CO_2$+$H_2O$. $CO_2$+$H_2O$+HSS on carbon steel is provided in Table 1 below.

TABLE 1

| | Corrosion Rate (mm/yr) | Corrosion Behavior |
|---|---|---|
| MDEA + 12% $CO_2$ | 0.18 | Active |
| MDEA + $CO_2$ + HSS | 0.38 | Active |
| MDEA + 12% $CO_2$ + 6% $O_2$ | 0.21 | Active |
| MDEA + 12% $CO_2$ + 6% $O_2$ + HSS | 0.37 | Active |
| MDEA + 12% $CO_2$ + 6% $O_2$ + DHSS | 0.44 | Active |

Table 1 provides data from a corrosion test conducted for one day at 50° C. under atmospheric pressure (121° F.) on A36 carbon steel. The measured corrosion rates were extrapolated to obtain the corrosion rate results, presented in millimeters per year. The initial MDEA solutions comprised a 50% aqueous MDEA solution. Unless otherwise specified, all compositions are provided in weight percent HSS comprised about 10,000 ppm bicine, about 2800 ppm formic acid and about 3000 ppm sulfuric acid, or about 1.5% HSS, while DHSS comprised about twice, or a doubling of the HSS, or about 20,000 ppm bicine, about 5600 ppm formic acid and about 3000 ppm sulfuric acid, or about 3% HSS. The nominal composition of A36 carbon steel and the composition of the carbon steel used in the short term corrosion test are provided in Table 2.

TABLE 2

| | C | Mn | P | S | Cu | Si |
|---|---|---|---|---|---|---|
| Nominal A36 Composition | 0.26 max. | | 0.04 max. | 0.05 max | | 0.04 max |
| Test Sample Composition | 0.23 | 0.279 | 0.02 | 0.03 | 0.29 | 0.20 |

As Table 1 indicates, the corrosion behavior of MDEA in the presence of $CO_2$ while capturing $CO_2$ was considered active. The corrosion rate of carbon steel increased significantly when HSS were present.

Table 3 provides data from a corrosion test conducted for one day at 50° C. under atmospheric pressure (121° F.) on A36 carbon steel. The measured corrosion rates were extrapolated to obtain the results presented in millimeters per year. The test conditions and the composition of the steel samples were the same as provided in Table 1. However, the MDEA included an effective amount of the amine-based chemical additive.

The amine-based chemical additive can be included with MDEA from about 5% up to 100% additive.

TABLE 3

| | Corrosion Rate (mm/yr) | Corrosion Behavior |
|---|---|---|
| MDEA + 12% $CO_2$ | 0.0028 | Passive |
| MDEA + 12% $CO_2$ + 6% $O_2$ | 0.0021 | Passive |
| MDEA + 12% $CO_2$ + 6% $O_2$ + HSS | 0.0017 | Passive |
| MDEA + 12% $CO_2$ + 6% $O_2$ + DHSS | 0.39 | Active |

Table 3 indicates that when the amine-based chemical additive is present in the MDEA to form an aqueous MDEA solution, the corrosion behavior of the carbon steel changes from active to passive. This passive behavior is exhibited even in the presence of $CO_2$, $O_2$ and HSS. This passive behavior is not lost until the HSS concentration is increased significantly, by doubling its content from about 1.5% by weight to about 3% by weight. Thus, Tables 1 and 3 support the fact that a structural carbon steel such as A36 spontaneously passivates in the presence of an aqueous solution comprising MDEA and the amine-based chemical additive.

Short term (1 day) and longer term (1 week) corrosion tests were used to measure corrosion using coupons. These tests were conducted on structural carbon steel having the composition listed in Table 2. The tests were conducted using both aqueous MDEA and an aqueous MDEA solution comprising MDEA and the amine-based chemical additive. These tests were conducted under atmospheric conditions at a controlled temperature of 50° C.

The results are tabulated in Table 4, below for aqueous MDEA.

TABLE 4

| | Short Term Corrosion Rate (mm/yr) | Long Term Corrosion Rate (mm/yr) | Corrosion Behavior |
|---|---|---|---|
| $CO_2$ | 0.18 | 0.1 | Active |
| $CO_2 + O_2$ | 0.21 | 0.24 | Active |
| $CO_2 + O_2$ + HSS | 0.37 | 0.49 | Active |

The results for an aqueous MDEA solution are tabulated below in Table 5.

TABLE 5

| | Short Term Corrosion Rate (mm/yr) | Long Term Corrosion Rate (mm/yr) | Corrosion Behavior |
|---|---|---|---|
| $CO_2$ | 0 | 0 | Passive |
| $CO_2 + O_2$ | 0 | 0 | Passive |
| $CO_2 + O_2$ + HSS | 0 | 0 | Passive |

The long term tests confirm the findings of the short term test, which is that a structural carbon steel such as A36 spontaneously passivates when in contact with an aqueous MDEA/amine-based chemical additive solution even in the presence of $CO_2$, $O_2$ and HSS.

Long term corrosion rate testing was also performed on a different composition of A36 structural carbon steel to determine whether the composition affects corrosion behavior. The chemical composition of a second composition of A36 is provided in Table 6.

TABLE 6

| C | Mn | P | S | Cu | Si |
|---|---|---|---|---|---|
| 0.14 | 0.83 | 0.02 | 0.01 | 0.39 | 0.04 |

Long term testing of this composition of an aqueous MDEA solution further comprising anamine-based chemical additive was conducted under atmospheric conditions at a controlled temperature of 50° C. The testing results for this composition are identified in Table 7 as carbon steel Type B, while results for the composition of Table 2 are identified as carbon steel Type A.

TABLE 7

| | Average Corrosion Rate for Seven Days (mm/yr) | |
|---|---|---|
| | Carbon steel Type A | Carbon steel Type B |
| CO2 | passive | 0.12 |
| CO2 + O2 | passive | 0.18 |
| CO2 + O2 + HSS | passive | 0.32 |

As indicated, Type A carbon steel exhibited a corrosion rate that was passive, while Type B carbon steel exhibited a higher corrosion rate. Type A carbon steel includes a higher weight percentage of carbon than does Type B carbon steel. Carbon is the most important alloying element in a low alloy steel, carbon having the greatest impact on mechanical properties. Carbon in a low carbon structural steel promotes the formation of pearlite. Thus, while both carbon steels will have a ferritic-pearlitic microstructure, Type A carbon steel will exhibit a higher percentage of pearlite than will Type B carbon steel. Pearlite is a structure comprising alternating layers of ferrite and $Fe_3C$. $Fe_3C$, also referred to as iron carbide or cementite, is a hard and brittle phase. Type A carbon steel also includes a higher silicon content. While silicon has a ferrite-stabilizing effect, it also increases the corrosion resistance and acid resistance of a carbon steel. While copper may improve the corrosion resistance of a carbon steel, the differences in copper content between Type A carbon steel and Type B carbon steel are not believed to be sufficient to result in measurable differences in corrosion performance in A36 carbon steel.

The surface finish of the carbon steel material also appeared to have an effect on the corrosion performance. Type A carbon steel samples having surface finishes that were prepared by sand blasting yielded a surface finish of about 157 Ra. Polishing with #600 SiC paper improved the surface finish to about 39 Ra, and the samples exhibited different corrosion behavior than Type A carbon steel samples having a surface finish that was prepared by sand blasting, polishing with #600 SiC paper, followed by polishing with 3μ diamond compound, which improved the surface finish to at least about 32 Ra. Type A carbon steel that had the diamond polished surface exhibited spontaneous passivation in an environment of MDEA+CO2+O2+HSS, whereas Type A carbon steel samples that had the surface finish prepared by sand blasting and polishing with #600 SiC paper displayed active corrosion behavior. Type B carbon steel exhibited active corrosion behavior with both surface finishes.

The service life of structural carbon steel used in gas capture plants can be extended in gas capture applications for uses in equipment such as the bottom of an absorber, amine cooler tubes, reflux drums and regenerator shell. The life of structural carbon steel used in such plants can be improved by carefully controlling the fluid chemistry in contact with the carbon steel. By the addition of an amine-based chemical additive to MDEA to form the aqueous MDEA solution, the structural carbon steel may spontaneously passivate. The passivation can be maintained by controlling HSS at about 1.5% or below while monitoring the $CO_2$ and $O_2$ levels in the solution. Without wishing to be bound to theory, the spontaneous passivation may result from the formation of a very thin film of $FeCO_3$ on the surface of the carbon steel that forms a diffusion barrier. As oxidizing agents are increased in the MDEA solution, the rate of iron dissolution increases and the acceleration of the corrosion process is also increased.

Figure 2:
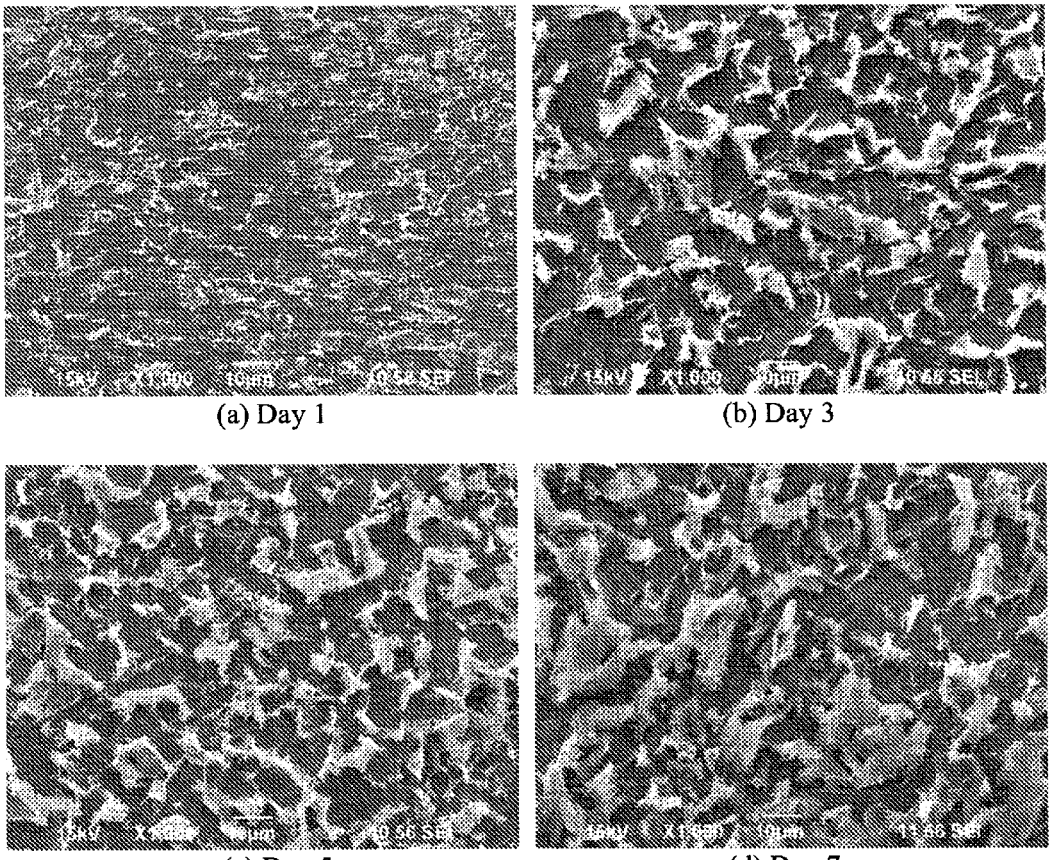
FIG. 2 are SEM surface morphologies of carbon steel with increasing time in 50 wt. % MDEA/12% $CO_2$/6% $O_2$/HSS.
Figure 3:
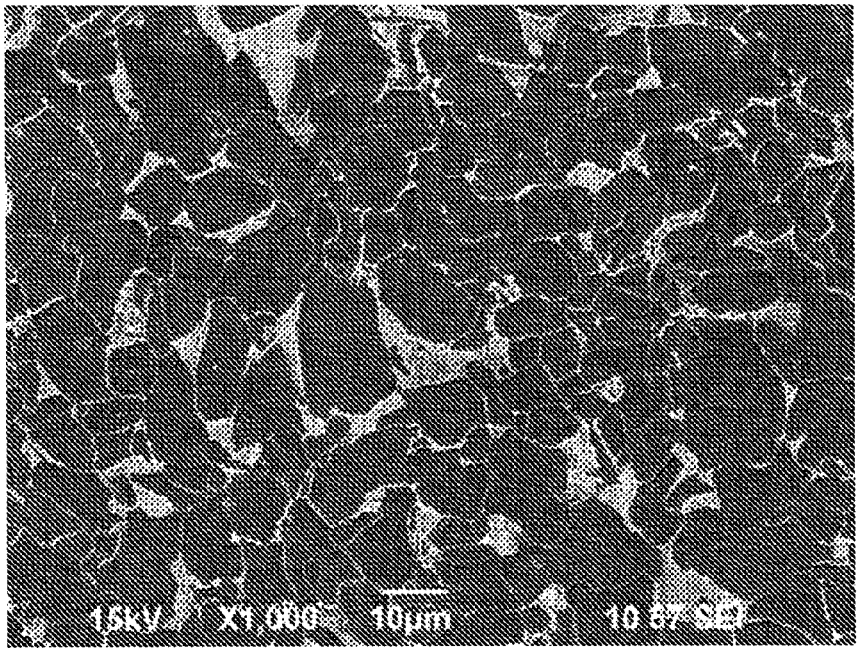
FIG. 3 are photomicrographs of A36 carbon steel depicting its ferritic-pearlitic microstructure.

The chemical composition of the structural carbon steel also can be controlled to improve the life of the components. As Tables 2, 5 and 7 suggest, the structural carbon steel utilized should contain maximum levels of carbon. A36 structural steel may include up to 0.26% max. by weight of carbon. Superior corrosion performance was observed in coupons that included carbon content above 0.14%. FIG. 2, 3 and 4 depict the microstructure of A36 carbon steel after progressively longer times of exposure to the MDEA+ $CO_2O_2$HSS solution. FIG. 4 also shows the EDS spectra after 7 days of exposure. These figures indicate that corrosion occurs by preferential dissolution of ferrite, while cementite accumulated preferentially as the corrosion proceeded. Thus, the carbon in the steel desirably may be increased beyond the maximum amount specified by the limits for A36 steel, up to about the eutectoid carbon composition, 0.76% C. Alternatively, the carbon content may be increased in the exposed surface of the steel by carburizing. Both of these processes will increase the pearlite and the cementite in the surface of the carbon steel exposed to the MDEA solution, which should increase the pearlite (and cementite) in the steel, thereby further minimizing corrosion.

The service life of the structural carbon steel used in gas capture plants also can be extended by controlling the surface finish. By providing a very smooth surface finish, as defined herein, a surface finish of 32 Ra or smoother the corrosion resistance of the carbon steel can be improved and the service life of the equipment can be extended. It is believed that less surface area is exposed to the MDEA solution when a smoother surface finish is provided.

While the data indicates that any one of controlling chemistry of the amine gas removal solution so as to cause spontaneous passivation of carbon steel, controlling the chemistry, and hence the structure, of the structural carbon steel to promote passivation by facilitating the formation of a protective diffusion barrier, and providing a smooth surface finish independently improve the corrosion resistance of the carbon steel, any combination of chemistry control of the solution, chemistry control of the structural carbon steel and surface finish of 32 Ra and smoother should further enhance the performance of structural carbon steel used in gas capture plants for equipment applications such as the bottom of an absorber, amine cooler tubes, reflux drums and regenerator shell applications and may permit the substitution of structural carbon steel in some current applications that require stainless steels such as 304 stainless steels.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas treating system for a coal-fired plant, comprising:

an aqueous amine solvent;

an amine-based chemical added to the amine solvent to form an amine solution;

up to about 6% $O_2$ by weight in the solution;

up to about 12% $CO_2$ by weight in the solution;

up to about 1.5% heat stable salts;

an alkanoamine treating unit wherein at least some components of the treating unit comprise a structural carbon steel;

wherein the structural carbon steel includes at least about 0.18% by weight carbon, and wherein a surface of the carbon steel is in direct contact with the amine solution.

2. The gas treating system of claim 1 wherein the heat stable salts further comprise bicene, formic acid and sulfuric acid.

3. The gas treating system of claim 1 wherein the surface of the carbon steel in direct contact with the amine solution is micropolished to have a surface finish of 32 Ra and smoother.

4. The gas treating system of claim 1 wherein the carbon steel has a carbon content of at least about 0.23% by weight.

5. The gas treating system of claim 1 wherein the carbon steel has a silicon content of at least 0.04%.

6. The gas treating system of claim 1 wherein the carbon steel is A36 having a carbon content of at least about 0.18% by weight.

7. The gas treating system of claim 1 wherein the carbon steel in contact with an amine solution is treated to have a carbon content of at least 0.18% by weight.

8. The gas treating system of claim 1 wherein the carbon steel in contact with an amine solution is treated to have a carbon content of at least 0.23% by weight.

9. The gas treating system of claim 1 wherein a surface of the carbon steel in contact with the amine solution is carburized to increase the carbon content of the surface to at least 0.18% by weight.

10. The gas treating system of claim 1 wherein the carbon steel in contact with the amine solution is carburized to increase the carbon content of the surface to at least 0.23% by weight.

11. A gas treating system fora coal-fired plant, comprising:

an aqueous amine solvent;

an amine-based chemical added to the amine solvent to form an amine solution;

up to about 6% $O_2$ by weight in the solution;

up to about 12% $CO_2$ by weight in the solution; up to about 1.5% heat stable salts;

an alkanoamine treating unit wherein at least some of the components comprise a structural carbon steel, wherein the structural carbon steel includes at least about 0.18% by weight carbon and wherein a surface of the carbon steel is in direct contact with the amine solution; and wherein the structural carbon steel in contact with the amine solution is characterized by spontaneous passivation whereby the corrosion behavior is passive.

* * * * *